Figure 1:
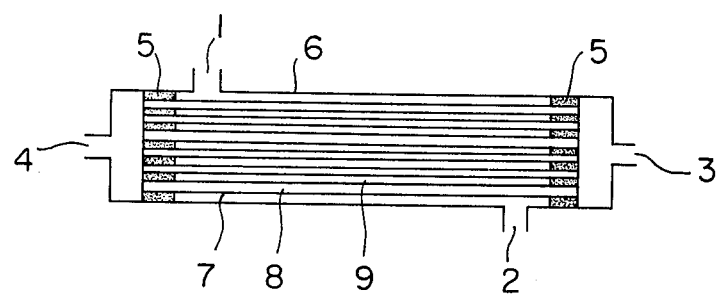

United States Patent [19]

Shindo et al.

[11] 4,268,279

[45] May 19, 1981

[54] GAS TRANSFER PROCESS WITH HOLLOW FIBER MEMBRANE

[75] Inventors: Mizuo Shindo; Takashi Yamamoto, both of Ootake; Kensuke Kamada, Chiba, all of Japan

[73] Assignee: Mitsubishi Rayon Co., Ltd., Tokyo, Japan

[21] Appl. No.: 45,868

[22] Filed: Jun. 6, 1979

[30] Foreign Application Priority Data

Jun. 15, 1978 [JP] Japan .................. 53-72431

[51] Int. Cl.³ .................. B01D 13/00; B01D 53/22
[52] U.S. Cl. .................. 55/16; 55/158; 210/321.3; 422/48
[58] Field of Search .................. 55/16, 158, 159; 210/321 B; 422/44, 48

[56] References Cited

U.S. PATENT DOCUMENTS

| 2,972,349 | 2/1961 | DeWall | 422/48 X |
|---|---|---|---|
| 3,342,729 | 9/1967 | Strand | 422/48 X |
| 3,526,481 | 9/1970 | Rubricius | 422/48 |
| 3,567,666 | 3/1971 | Berger | 55/158 X |
| 3,631,654 | 1/1972 | Riely et al. | 55/159 |
| 3,651,616 | 3/1972 | Blanchard et al. | 422/48 X |
| 3,651,618 | 3/1972 | Klein et al. | 55/158 X |
| 3,794,468 | 2/1974 | Leonard | 55/158 X |
| 3,803,810 | 4/1974 | Rosenberg | 55/159 |
| 3,953,566 | 4/1976 | Gore | 264/288 |
| 4,031,012 | 6/1977 | Gics | 55/158 X |

FOREIGN PATENT DOCUMENTS

| 1568130 | 5/1969 | France | 422/48 |
|---|---|---|---|
| 1536681 | 12/1978 | United Kingdom | 55/159 |

*Primary Examiner*—Robert H. Spitzer
*Attorney, Agent, or Firm*—Oblon, Fisher, Spivak, McClelland & Maier

[57] ABSTRACT

A process which comprises allowing a liquid to contact with the inside of a microporous hollow fiber and a fluid to contact with the outside, thereby allowing the gaseous components contained in both fluids to transfer between said liquid and said fluid. For use in the process, the inner diameter of the hollow fiber should be 50 to 5,000$\mu$ and the wall membrane should have an average micropore diameter of 0.01 to 0.5$\mu$, a porosity of 10 vol.-% or more, a micropore surface area of 5 m²/g or more, and an oxygen permeability of $10^{-6}$ cm³(STP)·cm/cm²·sec·cmHg or more. In cases where the liquid is water or a liquid substance with aqueous medium, the process can be used effectively in artificial lung units or the like by using a hollow fiber of a polyolefin or a fluorinated polyolefin.

4 Claims, 1 Drawing Figure

GAS TRANSFER PROCESS WITH HOLLOW FIBER MEMBRANE

This invention relates to a gas transfer process which comprises contacting a liquid substance with a fluid comprising a gas or a liquid through a separatory membrane of high gas permeability of hollow fibers to allow gaseous substances contained in the fluid to be supplied to or absorbed by said liquid substance or to allow gaseous substances contained in the liquid substance to be discharged into the fluid or to effect simultaneously such supply and discharge. This invention relates also to a device for carrying out such a process, construction materials therefor, and applications of such a process.

For the purpose of supplying or separating specific gaseous components by contacting a fluid with a liquid substance so that the gaseous substances contained in the fluid are chemically or physically absorbed in the liquid substance or, conversely, the gaseous substances contained in the liquid substance are released into the fluid, or these gaseous substances are exchanged between the fluid and the liquid substance, there have been widely used in industries such equipments and methods as bubbling tower, packed tower, plate tower, spray tower, wetted wall tower, bubble cap tower, rotating disks, aeration tank, etc. These systems have merits and demerits and are properly used in accordance with the purpose of use. A disadvantage common to these systems is the small gas-liquid contact surface area per unit volume of the equipment and, hence, it is difficult to make the small equipment and to effect the gas-liquid contact with high efficiency. Moreover, these methods are excluded from some uses where it is necessary to avoid the direct contact between the gas and the liquid.

On the contrary, the gas transfer process with a separatory membrane can eliminate the difficulties mentioned above and provide new uses. An example of using a separatory membrane has been disclosed in British Pat. No. 1,536,681, wherein a silicone tube is used as the gas permeable membrane and water containing gases such as oxygen dissolved therein is passed along the outer surface of the tube while passing a carrier gas through the tube, whereby the gases dissolved in the water is effectively removed. This tubular membrane, however, has disadvantages in that it is insufficient in gas permeability and because of the difficulty in enlarging the contact surface owing to the tubular form of the device, it is difficult to treat efficiently a large volume of substances.

Among typical means for supplying a gas to a liquid substance through a gas permeable separatory membrane, there has been known an artifical lung unit. In conventional artificial lung units of the membrane type, use was made of mainly a film-type membrane of silicone resin which has a comparatively high permeability. In order to increase the membrane area per unit volume of the device, an artificial lung unit comprising a membrane formed of capillary tubes has been disclosed in U.S. Pat. No. 2,972,349. According to the description in said patent, the shaping of said capillary tube membrane required a pains-taking procedure of immersing cores of fine pins in a polymer solution to form a polymer film on the surface of each pin and thereafter extracting the pins, leaving behind a capillary tube membrane. Among various polymer materials cited as suitable, choice was made of silicone rubber in examples of embodiments of the process. It is presumable that in the prior art at that time, the object of investigation was non-porous membranes and silicone rubber was selected because of a higher gas permeability.

On the other hand, with the progress in membrane technology in later years, various porous hollow fiber membranes have been developed and the structures and manufacturing methods of hydrophobic polymers have been disclosed in U.S. Pat. No. 4,020,230 for polyethylene and in U.S. Pat. No. 4,055,696 for polypropylene. When the order of magnitude of oxygen permeability is compared in terms of $cm^3(STP) \cdot cm/sec \cdot cm^2 \cdot cmHg$, that of silicone rubber is $10^{-8}$, whereas that of polyethylene and polypropylene hollow fibers is as large as $10^{-6}$. However, these patents have scarcely disclosed about the gas transfer between fluids.

The present inventors advanced extensive studies on the gas transfer process utilizing these microporous hollow fibers and, as a result, found that in an artificial lung model experiment in which a liquid simultating human blood had been fed into the lumen of hollow fibers, the liquid-phase resistance to transfer of oxygen at the inside of the hollow fibers was extraordinarily large and it is necessary for the construction of a useful artificial lung unit to increase the oxygen permeability of the hollow fiber membrane to an order of magnitude of at least $10^{-6}$. This finding was a starting point to accomplish the present invention.

The objects of this invention are to provide a process for the gas transfer between fluids utilizing microporous hollow fibers, particularly an effective process in the application to artificial lung units; a device and materials thereof for use in said process; and the method of manufacturing such a device.

This invention provides a process which comprises using a microporous wall membrane of a microporous hollow fiber as contacting wall membrane and placing a liquid inside the hollow fiber and a fluid outside, thereby allowing the gaseous components to transfer to the inside or outside of the hollow fiber by utilizing transmembrane pressure difference of said gaseous component between the inside and the outside of the hollow fiber. For this purpose, said porous hollow fiber membrane should have (i) an average micropore diameter in the range of from 0.01 to $0.5\mu$, (ii) an internal diameter of the hollow fiber in the range of from 50 to $5,000\mu$, (iii) a porosity of the membrane of 10% by volume or more, (iv) a micropore surface area of the membrane of 5 $m^2/g$ or more, and (v) an oxygen permeability of the membrane of $1 \times 10^{-6}$ $cm^3(STP) \cdot cm/cm^2 \cdot sec \cdot cmHg$ or more.

The invention is described below in detail.

The method of this invention is a method of gas transfer through a separatory membrane. Therefore, attention must be paid to the fact that the phase of a substance which moves through the membrane is fundamentally different from that in the dialysis or ultrafiltration using a conventional hollow fiber membrane. In the method of this invention, the substance passing through the membrane is in the gas phase even if the fluids contacting through the membrane are liquids. Accordingly, in such a case, the substances moving through the membrane are gaseous components dissolved in a liquid and components which are comparatively volatile. Also, the membrane itself should have such properties that it is permeable to gaseous components or components in the vapor phase but not to liquids under operative conditions. Non-porous films of common polymers may be said to be substantially gas permeable and liquid impermeable membranes. However, even a silicone film which is highly permeable to gases has a gas permeability (hereinafter referred to as GPR) of an order of $10^{-8}$. One of the important features of this invention is to use a hollow fiber membrane having GPR of an order of $1\times10^{-6}$ or more. In general, in order to realize such a high GPR with a membrane having sufficient strength, it is necessary to impart to the membrane a microporous structure. On the other hand, such a microporous membrane tends to become permeable to not only a gas but also liquids. As general means to overcome such a difficulty, it is conceivable to overlay the microporous membrane with a thin non-porous film. Another method is to select properly the material and structure of microporous membrane and the type of liquid being contacted with the membrane. In the latter case, if the liquid is oleophilic such as paraffin or an oil, the membrane material can be selected from the hydrophilic polymers having poor affinity toward the liquid. However, a most common liquid is water or a liquid substance with aqueous medium. In such a case, the membrane material can be selected from the hydropholic polymers difficultly wettable with water. In either case, if the diameter of micropores in the membrane is large, the liquid will pass through the membrane. Therefore, the microstructure should be such that there exist in the membrane a great many micropores which are sufficiently open porous structure. In order to meet such a requirement, it is necessary that the average diameter of micropores is $0.01\mu$ or more, preferably $0.02\mu$ or more and $0.5\mu$ or less, preferably $0.4\mu$ or less.

The average diameter of micropores as herein referred to is a value obtained from the measurement of the surface area of micropores and the porosity and by use of the following formula (2). Assuming for the sake of simplicity that the pore is in the form of a sphere of radius r, the total surface area S of the pores per unit weight of the membrane is represented by the formula $$S = 4\pi r^2 N \quad (1)$$

where N is the number of pores. On the other hand, since the volume of pores is $4/3 \cdot \pi r^3 N$, the radius r is represented by the formula $$r = 3 \times \frac{\epsilon}{1-\epsilon} \times \frac{1}{\rho S} \quad (2)$$

where $\epsilon$ is porosity (in volume fraction) and $\rho$ is the polymer density. Therefore, r is calculated from the measured values of surface area S and porosity $\epsilon$ of the hollow fiber. The average micropore diameter is twice r. Since the shape of pore was assumed to be spherical, the average pore diameter obtained from the formula (2) may not be correct if, for example, the shape is ellipsoidal or the pore wall shows irregularities. However, the present inventors performed tests on actual membranes and confirmed that the pore diameter obtained by electron-microscopic observation and that calculated by the formula (2) are in fair agreement.

As is seen from formulas (1) and (2), both the porosity and the surface area are required to be sufficiently large for the membrane having a great many micropores and, in addition, a large GPR. If the surface area is small, even though the porosity is very large, the membrane has a relatively small number of pores having a large diameter. Although GPR is large, such a membrane is not useful for the method of this invention. If the porosity is small, even though the surface area is quite large, the film has pores of small average diameter and it is difficult to obtain a membrane having a large GPR. Thus, in order to carry out effectively the method of this invention, the porosity should be 10 vol.-% or more, preferably 20 vol.-% or more, most preferably 30 vol.-% or more but below 70 vol.-%. The surface area is 5 m$^2$/g or more, preferably 10 m$^2$/g or more, most preferably 20 m$^2$/g or more but below 200 m$^2$/g. When such necessary conditions are satisfied, the average pore diameter of the membrane becomes $0.01\mu$ or more and $0.5\mu$ or less and the membrane has a great many of such pores, resulting in a large GPR. GPR should be at least $1\times10^{-6}$, preferably from $1\times10^{-5}$ to $1\times10^{-3}$.

The microporous hollow fiber employed in the method of this invention has preferably an internal diameter of 50 to 5,000$\mu$ and a hollow fiber membrane thickness of several $\mu$ to several hundred $\mu$. These characteristic values should be properly selected in accordance with the intended use. If it is intended to transfer a relatively large volume of gas in unit time or to transfer with a high efficiency, it is desirable to increase linear velocity of the liquid flowing through the lumen of hollow fibers to reduce the thickness of laminar film at the inside of the hollow fibers against the gas transfer, and to select a relatively small internal diameter of the hollow fiber of several tens $\mu$ to several hundred $\mu$. In order to further increase the rate of gas transfer, it is desirable to use hollow fibers having a lumen of triangular, square or other special profiles. In the case of hollow fibers having a relatively large internal diameter, it is desirable to provide flow obstacles such as baffles or protrusions in the flow channel of liquid within the hollow fiber to produce a turbulent flow effect by disturbing the flow.

In applying the method of this invention, there is no particular restriction on the type of gas, liquid containing gases, and liquid and various combinations can be used in accordance with the intended object.

Examples of gaseous substances which can be treated include air, oxygen, nitrogen, ozone, carbon monoxide, carbon dioxide, ammonia, hydrogen sulfide, sulfur dioxide, NO$_x$, hydrogen, helium, neon, argon, krypton, xenon, borane, silane; halogens such as chlorine and fluorine; hydrogen halides such as hydrogen fluoride and hydrogen chloride; lower alcohols having 1 to 6 carbon atoms such as methyl alcohol, ethyl alcohol, propyl alcohol, buty alcohol and hexyl alcohol; lower mercaptans having 1 to 6 carbon atoms such as methyl mercaptan, ethyl mercaptan and butyl mercaptan; lower amines having 1 to 15 carbon atoms such as methylamine, ethylamine, propylamine, butylamine, dimethylamine, triethylamine and tributylamine; saturated or unsaturated hydrocarbons having 1 to 10 carbon atoms such as methane, ethane, propane, butane, hexane, butadiene, ethylene, acetylene, benzene, toluene and xylene; halogenated hydrocarbons having 1 to 10 carbon atoms such as carbon tetrachloride, chloroform, trichloroethylene, tetrachloroethylene, vinyl chloride, vinylidene fluoride and tetrafluoroethylene; and mixtures of above-listed compounds.

Desirable liquids are those having a large contact angle with materials of the porous hollow fibers such as polyethylene, polypropylene and polyvinylidene fluoride. Particularly preferred liquids are water and aqueous liquids (liquids with water as medium). The aqueous liquids include aqueous solutions, aqueous dispersions, aqueous colloidal solutions, fluids containing acidic or alkaline compounds, various salts, gaseous substances or organic compounds which are dissolved or dispersed in aqueous media, and body fluids. Other liquids such as alcohols, esters, hydrocarbons, blood and the like may also be used. In the case of liquids having a small contact angle with the material of hollow fibers, difficulties may often be encountered in the operation of the method of this invention, such as clogging of micropores by the intrusion of liquid and bleeding of the liquid from the hollow fiber. To keep the membrane from such troubles, it is desirable to carry out the gas-liquid contact while keeping the pressure in the channel of fluid flow higher than that in the channel of liquid flow or to take other suitable measures.

The gas transfer process of this invention is most effectively carried out in the cases where the liquid flowing inside the hollow fiber is water or an aqueous liquid and the fluid flowing outside the hollow fiber is a gas, a vapor, water or an aqueous liquid. In such cases, even microporous hollow fibers of polyacrylonitrile, cellulose acetate, polyamides and polysulfone which are relatively hydrophilic can be used after having been made hydrophobic by the after-treatment with silicone resins or fluoro resins. The most effective way is to use microporous hollow fibers of inherently hydrophobic materials preferably such as polyolefins including, for example, polyethylene, polypropylene, poly(3-methylbutene-1) and poly(4-methylpentene-1) or polyvinylidene fluoride and melt-spinnable crystalline fluoropolyolefins such as copolymers of 10 to 90 mole-% of tetrafluoroethylene and 90 to 10 mole-% of hexafluoropropylene and copolymers of 10 to 90 mole-% of ethylene and 90 to 10 mole-% of tetrafluoroethylene. These polymers can be homopolymers or copolymers with minor proportions of other monomers or blends. These fibrous materials are microporous membranes in the form of hollow fibers having in the wall mutually communicated extremely fine voids and are excellent in resistances to water, chemicals and heat. They can be manufactured from highly oriented crystalline undrawn hollow fibers by drawing at relatively low temperatures by the method disclosed in U.S. Pat. No. 4,055,696 or Japanese Patent Application Laid-open ("Kokai") No. 137,026/77 and an improved method.

U.S. Pat. No. 4,020,230 has disclosed a method for producing microporous polyethylene hollow fibers, which comprises melt-spinning polyethylene which was incorporated with a plasticizer and, after drawing, extracting the plasticizer with a solvent to form micropores. The hollow fibers obtained by such a method are difficult to be perfectly free from the plasticizer and are not desirable for use in medical treatment dealing with blood or the like.

Polypropylene is an especially desirable material from which undrawn hollow fibers having higher oriented crystallinity than that of polyethylene are obtainable and these hollow fibers, on being drawn, easily yield microporous hollow fibers. When used in medical treatments, the microporous polypropylene hollow fibers are a very desirable material, because the crystalline melting point of polypropylene is higher than that of polyethylene and, hence, the microporous polypropylene hollow fibers can be easily sterilized with superheated steam or the like.

These microporous hydrophobic hollow fibers have a large contact angle against water, being mostly 90° or more. The homopolymers are inherently hydrophobic or difficulty wettable with water and the microporous hollow fibers of these materials function excellently especially when the liquid flowing inside the hollow fibers is water or an aqueous liquid. For instance, when it is intended to render a gas to be absorbed by water or an aqueous liquid, it is not always necessary to keep the flowing gas pressure higher than the pressure in liquid flow channel which is separated by the wall membrane of the hollow fiber from the gas flow. Thus, such hollow fibers have an advantage in that a long run operation with satisfactory result is possible even at a relatively high linear velocity of the liquid while feeding the gas under atmospheric pressure or a relatively low back pressure. Such performance characteristics are particularly useful in releasing gaseous components from water or an aqueous liquid. Even when the liquid flow channel is kept at a positive pressure, the operation can be continued satisfactorily while keeping micropores in the wall membrane of hollow fibers from clogging with water.

The gas transfer process of this invention is useful for artificial organs, particularly artificial lung wherein the liquid flowing inside the hollow fiber is the blood. By feeding oxygen or an oxygen-containing gas to the outside of hollow fibers, it is possible to supply effectively the oxygen to the blood and removing carbon dioxide from the blood without direct contact of the blood with the gas.

As an example of the cases where the fluids flowing inside and outside the hollow fibers are both liquids, when an acidic aqueous solution flows inside the hollow fiber and an ammonia-containing aqueous solution flows outside, the ammonia in the outside liquid vaporizes on the external surface of the hollow fiber and moves as the gas phase through the membrane and is absorbed effectively by the acidic water on the internal surface of the hollow fiber. Even if the pressures of both liquids are the same, the absorption of ammonia occurs continually so long as the acidic aqueous solution retains ammonia absorptive capacity. Thus, similarly to the gas transfer between liquid and gas, the gas exchange between liquids continues until the partial pressure (activity in strict sense) of the gas in both liquids become identical. Accordingly, as in the above case of ammonia absorption, when the ammonia absorbed by the absorbent liquid is converted to another chemical compound, the gas transfer process can be carried out very effectively.

According to this invention, since the gas transfer is carried out efficiently by use of hollow fibers, the equipment can be made compact. Practical application fields include medical treatment devices, typically artificial lung and artificial kidney; analytical equipments such as gas sensor, gas chromatography and liquid chromatography; environmental pollution preventive appliances for removing noxious gases such as ammonia, hydrogen sulfide, sulfur dioxide, and the like; gas industries; biochemical and fermentation industries where the process can be utilized, for example, in removing alcohol from fermentation tanks or for the purpose of surveillance.

The invention is illustrated below in detail with reference to accompanying drawings.

FIG. 1 is a front sectional view of an example of the device for carrying out the gas transfer process of this invention.

In FIG. 1, 1 is a fluid inlet, 2 a fluid exit or inlet, 3 a liquid inlet, 4 a liquid exit, 5 an adhesive, 6 a pressure vessel, 7 a microporous hollow fiber, 8 a liquid channel inside the microporous hollow fiber, and 9 a fluid channel.

The liquid being subjected to gas removal or gas feed treatment is introduced via the liquid inlet 3. While passing through the lumen of the microporous hollow fiber, the liquid is released of a gaseous component or fed with a gas or subjected to exchange of gaseous components through the microporous wall of the hollow fiber, and finally discharged from the exit 4. On the other hand, a gas or a fluid containing a gas is introduced via the fluid inlet 1 into the device, passes through the fluid channel 9 outside the microporous hollow fiber 7 in the pressure vessel 6, and is discharged from the fluid exit 2.

When the feeding and releasing of gases are carried out simultaneously, the fluid exit 2 serves as the exit for the residual gas in the fluid introduced from the inlet 1 and the fluid containing a gaseous substance released from the liquid. When it is intended only to feed a gas to a liquid, the fluid exit 2 is not necessarily kept fully open but can be partially or completely closed to increase the pressure in the fluid channel for the purpose of feeding the gas more positively and efficiently.

When it is intended only to release the gaseous components from a liquid, a gas is frequently used as the outside fluid. In this case, the fluid inlet 1 serves as the inlet for the carrier gas employed to carry away the released gases. The fluid exit 2 can be connected to either an outside atmosphere at atmospheric pressure or an outside atmosphere under a reduced pressure to promote the release of gaseous components by applying a negative pressure to the fluid channel against the liquid channel.

Figure 2:
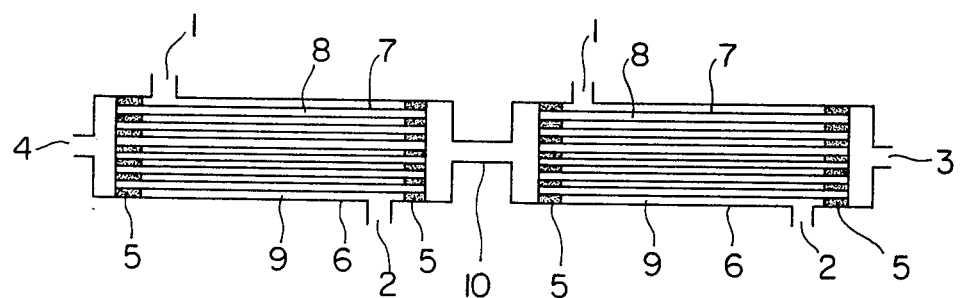

FIG. 2 is a front sectional view of an example of the device according to this invention to carry out separately the feeding of a gas and the release of a gas by arranging two hollow fiber modules in series. In FIG. 2, 1 is a fluid inlet or exit, 2 a fluid exit or inlet, 3 a liquid inlet, 4 a liquid exit, 5 an adhesive, 6 a pressure vessel, 7 a microporous hollow fiber, 8 a liquid channel inside the microporous hollow fiber, 9 a fluid channel outside the microporous hollow fiber, and 10 a connecting tube for the modules.

In this device, the liquid being fed with a gas or being released of a gas is introduced via the liquid inlet 3, passes through the liquid channel 8 inside the microporous hollow fiber, and is discharged from the liquid exit 4. On the other hand, the gas or a liquid containing the gas is introduced via the fluid inlet 1 into the first module and the gas is fed through the microporous wall membrane of the hollow fiber to the liquid flowing inside the hollow fiber. The residual gas or the liquid containing the residual gas is discharged from the fluid exit 2 to the outside of the module. When it is intended to promote the feeding of gas to the liquid, it is desirable to set the pressure in the fluid channel at a higher level than the pressure level of the liquid channel inside the hollow fiber. The liquid fed with the gas in the first module is introduced through the connecting tube 10 into the second module where the gaseous components comprising excess gas, unreacted gas, or gases formed by the reaction with liquid components are released to the fluid channel 9 through the microporous wall membrane of the hollow fiber 7. In this case, the process is more effectively carried out by employing as the fluid outside the hollow fiber an absorbent solution for the gaseous components.

The gas-liquid contact device according to this invention has the following characteristic features and the invention can provide an excellent practicable gas transfer process useful in not only industrial fields but also medical treatment devices, e.g. artificial lung.

1. The separatory membrane is microporous and yet has a large gas permeability.
2. Since the microporous membrane is in the form of hollow fiber and its lumen serves as a liquid channel, the surface area of contact with a gas per unit volume of liquid is large.
3. Since the lumen of the hollow fiber is the liquid channel, it is feasible by proper selection of the lumen diameter to reduce the liquid-phase resistance by increasing the linear velocity of liquid flow, thereby to increase the efficiency of gas-liquid contact.
4. Particularly when the liquid is water or a liquid with aqueous medium, clogging of the microporous membrane can be minimized by selecting the material of separatory membrane from the inherently hydrophobic polymers such as polyolefins and fluoro polymers; hence, the pressure difference between the liquid channel and the fluid channel can be selected from a wide range.
5. Particularly when the liquid flowing inside or outside the hollow fiber is water or a liquid with aqueous medium and the material of separatory membrane is selected from inherently hydrophobic polymers such as polyolefins and fluoro polymers, it is possible to use a gas absorptive liquid as the liquid flowing either side of the separatory membrane, because there is no fear of intermixing of liquids, thus rendering the gas transfer more efficient.
6. The device is excellent in gas-liquid contact efficiency and can be reduced in size or made compact.
7. The device is low in operational cost and manufacturing cost.

The invention is further illustrated below with reference to Examples.

The gas permeability, surface area and porosity cited in the forgoing description and the following Examples were determined in the following manner.

Gas permeability (GPR): Twenty hollow fibers were assembled in a bundle of U-form and both ends were potted in a short tube and fixed by adhesive to prepare a mini-module for testing GPR. The effective length of each hollow fiber was 20 cm. Oxygen at a gauge pressure of 0.2 kg/cm$^2$ was introduced into the hollow fibers and the permeated gas volume was measured and corrected to standard temperature and pressure (STP). GPR in terms of cm$^3$(STP)·cm/cm$^2$·sec·cmHg was calculated from the measured thickness and inner surface area of the hollow fiber membrane and permeated gas volume.

Porosity: The hollow fiber membrane was immersed in a liquid. Porosity was calculated in terms of volume from the weight of liquid absorbed by the membrane and densities of the polymer and the liquid.

Surface area: Determined by the method of nitrogen absorption.

REFERENCE EXAMPLE

Preparation of microporous hollow fiber:
Polypropylene having a melt index of 10 g/10 min. (230° C) was melt spun under the following conditions through a hollow fiber spinnerette, 30 mm in nozzle diameter, having a concentric double tube structure of an annular slit width of 1.5 mm, the extrusion cross-sectional area having been 1.34 cm$^2$: introduction of air: self-suction; spinning temperature: 205° C.; extrusion rate: 10 g/min.; extrusion linear velocity: 8.27 cm/min.; take-up speed: 500 m/min.; spinning draft: 6046; spinning cylinder: 30 cm in length. The resulting undrawn hollow fiber was then heat treated to increase the crystal orientation by passing over a heated roller at 140° C. while maintaining the fiber length unchanged, the time of contact with the heated roller having been 60 seconds. The heat treated fiber was drawn by 20% between two rollers at room temperature to form a great number of crazes in the hollow fiber wall. The fiber was then hot drawn in 4 steps by passing through 4 slit heaters at 130° C. each disposed between rollers of different circumferential speed, the drawn rate having been 20% in each step. The drawn fiber was overfed by 30% to a slit heater at 145° C. to effect relaxation heat setting, whereby porous hollow fiber was continuously produced. The hollow fiber thus obtained had a length greater than the initial undrawn length by 104%, an outer diameter of 360$\mu$; an inner diameter of 300$\mu$, a porosity of 43%, a surface area of 48 m$^2$/g, a GPR of $5\times10^{-5}$ cm$^3$(STP)·cm/cm$^2$·sec·cmHg, and an average pore diameter of 0.10$\mu$, as calculated by the formula (2).

EXAMPLE 1

A device similar to that shown in FIG. 1 was assembled by using microporous polypropylene hollow fibers having micropores passing through from the outer surface to the inner surface of the hollow fibers as obtained in Referential Example. The effective length of each fiber excepting the fixed portion was 30 cm, the number of fibers 17,700 and the total membrane area 10 m$^2$/module, as calculated from the inner surface area of each fiber.

By using the device for the purpose of purifying nitrogen containing 5 vol.-% of oxygen, an aqueous alkaline pyrogallol solution containing 1% of potassium hydroxide and 1% of pyrogallol was passed through the lumen of each fiber at a total rate of 1000 liters/hour. The nitrogen being treated was passed outside each fiber at a pressure of 1 kg/cm$^2$ and a flow rate of 3 Nm$^3$/hour to effect absorption of oxygen by the pyrogallol solution through the microporous hollow fiber separatory membrane. The nitrogen content of the treated gas was 99.3% after single passage, indicating that 85% of the oxygen contained in the gas being treated had been removed.

EXAMPLE 2

Two modules, which were the same as that used in Example 1, were connected in series as shown in FIG. 2 and the liquid exit 4 and the liquid inlet 3 were connected through a pipe for the purpose of testing the removal of hydrogen sulfide from air containing the same. A 3% aqueous sodium carbonate solution was passed through the lumen of each fiber and circulated through modules 1 and 2 at a flow rate of 1000 liters/hour. Air containing 1% of hydrogen sulfide was introduced into the first module at a flow rate of 10 Nm$^3$/hour and a pressure of 1 kg/cm$^2$. On analysis, the hydrogen sulfide content of the air leaving the fluid exit was found to be 0.15%, indicating that 85% of the hydrogen sulfide had been removed. On the other hand, into the second module, a fresh air was introduced at a rate of 20 Nm$^3$/hour and a pressure of 1 kg/cm$^2$ to refresh the aqueous sodium carbonate solution. After the device had been operated continuously for 24 hours under the above conditions, the removal of hydrogen sulfide in the first module was 80%, indicating that the decline in purifying ability was very little.

EXAMPLE 3

In a manner similar to that in Reference Example, polyvinylidene fluoride having a melt index of 13 g/10 min. (230° C.) was melt spun to obtain a microporous hollow fiber having an outer diameter of 360$\mu$, inner diameter of 300$\mu$, porosity of 32%, surface area of 36 m$^2$/g, GPR of $2.4\times10^{-5}$cm$^3$(STP)·cm/cm$^2$·sec·cmHg, and average pore diameter of 0.036$\mu$. By using the microporous polyvinylidene fluoride hollow fibers obtained above, an experiment similar to that in Example 1 was run. The nitrogen content of the treated gas was 99% after single pass, indicating that 80% of the oxygen contained in the gas being treated had been removed.

EXAMPLE 4

The same module as in Example 1 was used. 1 N sulfuric acid was passed through the inside of hollow fibers at a rate of 1200 liters/hour. On the other hand, an aqueous solution containing 1 wt.-% of ammonia was passed outside the hollow fibers at a rate of 400 liters/hour. The aqueous ammonia solution discharged from the fluid exit of the module contained 0.05 wt.-% of ammonia, indicating that 95% of the ammonia contained in the aqueous ammonia solution had been removed.

EXAMPLE 5

Microporous polypropylene hollow fibers were prepared in a manner similar to that in Reference Example. The hollow fibers had the following characteristics:

| | |
|---|---|
| Inner diameter: | 200 $\mu$ |
| Membrane thicknesss: | 25 $\mu$ |
| Porosity: | 52% |
| Surface area: | 73 m$^2$/g |
| Average pore diameter: | 0.099 $\mu$ |
| GPR: | $1.0\times10^{-5}$cm$^3$(STP) . cm/cm$^2$ . sec . cmHg |

By using the hollow fibers a module, as shown in FIG. 1, having an effective single fiber length of 22 cm and an effective membrane area of 1 m$^2$ was prepared. A preserved bovine blood which had been converted to venous blood was pumped through the inside of the hollow fibers at a flow rate of 1 liter/minute and, at the same time, oxygen was fed from a bomb to the outside of hollow fibers at a rate of 6 liters/minute and at atmospheric pressure. On analysis of the blood at the inlet and outlet of the module for oxygen and carbon dioxide, it was found that the oxygen added to the blood was 55 ml/minute and the carbon dioxide removed from the blood was 100 ml/minute, indicating that the process of this invention can be utilized effectively in artificial lung units.

What is claimed is:

1. In a gas transfer process by using the microporous wall membrane of a microporous hollow fiber as contacting wall membrane and placing a liquid inside the hollow fiber and a fluid outside, thereby allowing the gaseous components to transfer to the inside or outside of the hollow fibers, an improved method wherein the improvement comprises using a hollow fiber having (i) an average micropore diameter in the range of from 0.01 to 0.5μ,
(ii) an internal diameter of the hollow fiber in the range of from 50 to 5,000μ,
(iii) a porosity of the membrane of 10% by volume or more,
(iv) a micropore surface area of the membrane of 5 m$^2$/g or more, and
(v) an oxygen permeability of the membrane of $1 \times 10^{-6}$ cm$^3$(STP)·cm/cm$^2$·sec·cmHg or more,
and wherein the microporous hollow fiber is polypropylene.

2. A gas transfer process according to claim 1, wherein the liquid inside the hollow fibers is water or a liquid substance with aqueous medium; and the fluid outside the hollow fibers is a gaseous substance or a liquid substance with aqueous medium.

3. A gas transfer process according to claim 1, wherein the liquid inside the hollow fiber is water or a liquid substance with aqueous medium; and the fluid outside the hollow fiber is a gas.

4. A gas transfer process according to claim 1, wherein the liquid inside the hollow fiber is a blood.

* * * * *